July 9, 1957 L. I. DURHAM 2,798,650
WASTE DISPOSAL BAG
Filed April 22, 1954 2 Sheets-Sheet 1
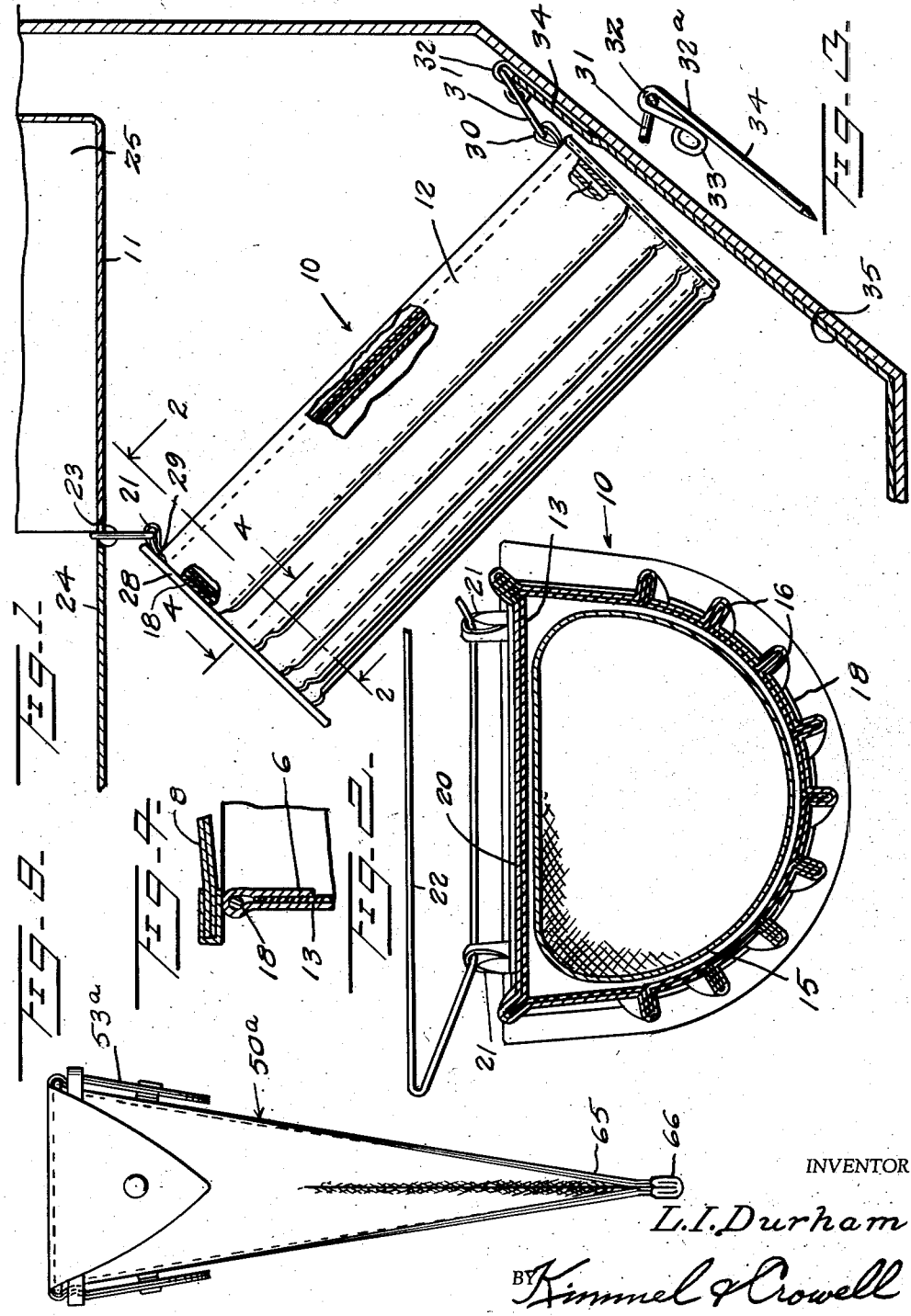
INVENTOR
L. I. Durham
BY Kimmel & Crowell
ATTORNEYS

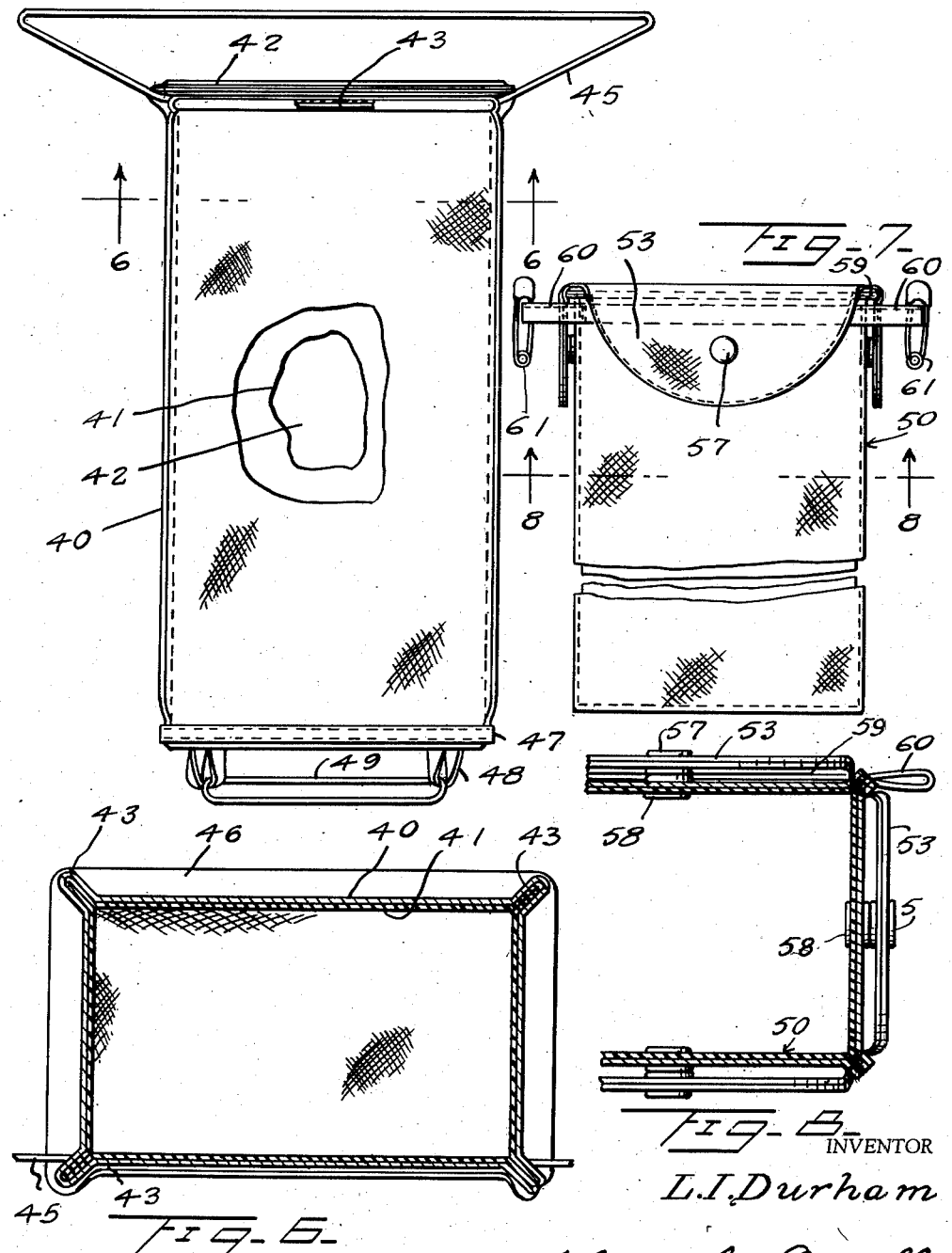

United States Patent Office 2,798,650
Patented July 9, 1957

2,798,650

WASTE DISPOSAL BAG

Lois I. Durham, Junction City, Oreg., assignor to Litterall, Inc., a corporation of Oregon Application April 22, 1954, Serial No. 424,988

1 Claim. (Cl. 224—42.46)

This invention relates to a waste disposal bag, and more particularly to a waste disposal bag which may be readily supported from a desired surface, as for example, under an automobile dashboard or on the side of a hospital bed or in any locality where a portable suspendible bag is desirable.

Another object of the invention is the provision of such a construction which is relatively sturdy and durable, which is provided with a waterproof inner liner, and which has means for maintaining the mouth thereof constantly open in such manner that a disposable receptacle may be readily inserted therein and withdrawn therefrom.

Still another object of the invention is the provision of such a device which is sturdy and durable in construction, reliable and efficient in operation, and relatively simple and inexpensive to manufacture, assemble, and utilize.

Still other objects reside in the combination of elements, the arrangement of parts, and features of construction, all as will be more fully pointed out hereinafter, and shown in the accompanying drawings wherein there is disclosed a preferred embodiment of this inventive concept.

In the drawings:

Figure 1 is a side elevational view, partly in section, of one form of waste disposal bag shown in position beneath the dashboard of an automobile or the like.

Figure 2 is a sectional view taken substantially along the line 2—2 of Figure 1 as viewed in the direction indicated by the arrows.

Figure 3 is a side elevational view of a constructional detail.

Figure 4 is an enlarged sectional view taken substantially along the line 4—4 of Figure 1 as viewed in the direction indicated by the arrows.

Figure 5 is a front elevational view, partly in section, of a modified form of this invention.

Figure 6 is an enlarged sectional view taken substantially along the line 6—6 of Figure 5 as viewed in the direction indicated by the arrows.

Figure 7 is a front elevational view, partly broken away, disclosing a further modified form of this invention.

Figure 8 is an enlarged fragmentary section view taken substantially along the line 8—8 of Figure 7 as viewed in the direction indicated by the arrows.

Figure 9 is a side elevational view of a still further modified form of this invention.

Similar reference characters refer to similar parts throughout the several views of the drawings.

Having reference now to the drawings in detail, and more particularly to the disclosure of the invention shown in Figures 1 to 4, inclusive, there is generally indicated at 10 a waste disposal bag particularly adapted for positioning beneath the dashboard 11 of a motor vehicle or the like.

The bag of the instant invention consists of an outside fabric or tapestry cover 12, an inner waterproof liner 13 within which latter is adapted to be positioned a paper or other disposable receptacle 15.

The outer covering is provided with a series of stitched longitudinally extending ribs 16 for the purpose of longitudinal reinforcement of the bag, and a reinforcing wire 18 extends about the upper periphery of the bag for maintaining the mouth thereof open. A similar wire 19 may be provided at the lower end of the bag if desired.

Secured to the rear wall 20 of the bag adjacent the top thereof are a pair of tabs 21 adapted for the accommodation of a looped cord 22 of flexible material which is adapted to fit over the hinge 23 of the door 24 of the dashboard compartment 25 for the purpose of supporting the upper end of the bag.

As best shown in Figure 4, the upper end of the fabric outer covering is reverted as at 26 and stitched to overlie the inner lining 13 to secure the latter in position as well as encompass the reinforcing wire 18. A flexible rubber or plastic lined lid 28 may be secured as by stitching 29 to the rear 20 of the bag portion if desired.

The lower portion of bag 10 is also provided with tabs 30 accommodating a flexible cord 31 which engages the bight 32 of a hook-shaped member 32a, the latter being provided with a reverted end portion 33 on one side and a pointed projection 34 on the other. The arrangement is such that when projection 34 is disposed beneath the upper edge of floor mat 35 the bag will be maintained in the angular position disclosed in Figure 1 so as to be conveniently out of the way and at the same time be readily accessible.

A modified form of construction is disclosed in Figures 5 and 6 wherein the outer cloth or fabric receptacle 40 contains an inner waterproof liner 41 and is adapted for the reception of a receptacle 42. In this construction the configuration of the device is rectangular rather than semicircular, and longitudinally extending stitched ribs 43 are provided at each corner thereof.

At the upper end of the device a string or cord 45, similar in construction and purpose to the cord 22, is provided, the latter being secured to the rear of the container in any desired manner as by stitching the same between the fabric and the rubber lining.

A flexible cover 46, similar to the cover 28, is also provided.

The lower portion of the device is provided with a reinforcing band 47 provided with tabs 48 for the accommodation of a cord 49, the latter being adapted to be engaged by hooks 32a employed in the same connection as that of the modification disclosed in Figure 1.

The modification of the invention shown in Figure 7 is a form of device adapted particularly for use in conjunction with hospital beds or the like, and includes a rectangular flexible washable casing generally indicated at 50. The device is formed with a plurality of reverted flaps 53 on the four sides thereof formed integrally with the tops of the side and end walls, and arcuate in configuration. These flaps are adapted to be secured on the outer sides of the bag by means of snap fastener elements 57—58 and retain a rectangular wire former member 59 to hold the mouth of the bag open.

At each end of one wall of the construction there is provided a tab 60 which may receive a safety pin 61 for pinning the device to the side of the bed or the like.

No lid is provided with this form of device, and it will be readily apparent that the employment of an interiorly positioned paper bag is here employed as in the foregoing modification.

In the form of the invention shown in Figure 9, the arrangement of flaps 53a and wire 59a about the top of a body portion 50a is substantially identical to that of the foregoing modification, but the bottom of the device of the last-named modification is formed of V-shape as at 65 and secured by a reverted hem 66 or the like for the reception of the bag in partially folded form.

Obviously, under certain circumstances where the necessity for a waterproof container is not present, the inner liner may be omitted, and, equally obvious, if desired, the outer fabric covering may be substituted therefor with a plastic container, obviating the necessity for a waterproof inner liner.

From the foregoing it will now be seen that there is herein provided an improved waste disposal bag, which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

A waste disposal container having open and closed ends comprising an elongated substantially semi-cylindrical outer fabric cover member and an inner waterproof liner therefor, a plurality of external longitudinally extending reinforcing ribs arranged in closely spaced parallel intervals in the curvilinear portion of said container, said ribs each comprising a gathered portion of said cover member and the adjacent portion of said liner, stitching extending through said cover and said liner in each of said ribs adjacent said container, means secured to each end of said container for maintaining said container in semi-cylindrical form, a closure member for the open end of said container, means pivotally securing said closure member to said container, and means secured to opposite ends of said container for supporting said container in elevated position.

References Cited in the file of this patent

UNITED STATES PATENTS

| | | |
|---|---|---|
| 1,005,014 | Franke | Oct. 3, 1911 |
| 1,401,660 | White | Dec. 27, 1921 |
| 1,480,406 | Mashek | Jan. 8, 1924 |
| 1,505,182 | Wrixton | Aug. 19, 1924 |
| 1,633,724 | Burris | June 28, 1927 |
| 1,681,922 | Bock | Aug. 28, 1928 |
| 2,431,452 | Barkl | Nov. 25, 1947 |
| 2,507,939 | Smith | May 16, 1950 |
| 2,631,630 | Brady et al. | Mar. 17, 1953 |